(12) United States Patent
Kong et al.

(10) Patent No.: US 11,774,224 B1
(45) Date of Patent: Oct. 3, 2023

(54) DEVICE AND METHOD FOR EVALUATING DAMAGE POWER OF INTERNAL EXPLOSION

(71) Applicant: WUHAN UNIVERSITY OF TECHNOLOGY, Wuhan (CN)

(72) Inventors: Xiangshao Kong, Wuhan (CN); Hu Zhou, Wuhan (CN); Zihan Zhu, Wuhan (CN); Cheng Zheng, Wuhan (CN); Weiguo Wu, Wuhan (CN)

(73) Assignee: WUHAN UNIVERSITY OF TECHNOLOGY, Wuhan (CN)

( * ) Notice: Subject to any disclaimer, the term of this patent is extended or adjusted under 35 U.S.C. 154(b) by 0 days.

(21) Appl. No.: 18/178,557

(22) Filed: Mar. 6, 2023

(30) Foreign Application Priority Data

Mar. 8, 2022 (CN) .......................... 202210219071.5

(51) Int. Cl.
  *F42B 35/00* (2006.01)
(52) U.S. Cl.
  CPC .................................... *F42B 35/00* (2013.01)
(58) Field of Classification Search
  CPC ...................................................... F42B 35/00
  See application file for complete search history.

(56) References Cited

U.S. PATENT DOCUMENTS

| | | | | |
|---|---|---|---|---|
| 2,937,530 A | * | 5/1960 | Haley | G01N 3/32 73/864.83 |
| 3,899,374 A | * | 8/1975 | Sylkhouse | C06B 47/14 149/46 |
| 4,932,239 A | * | 6/1990 | Regalbuto | G01N 33/227 73/35.14 |
| 6,354,137 B1 | * | 3/2002 | Guirguis | F42B 35/00 73/35.14 |

(Continued)

FOREIGN PATENT DOCUMENTS

| | | | | |
|---|---|---|---|---|
| CH | 109975356 | * | 7/2019 | ............. F42B 35/00 |
| RU | 2756991 C1 | * | 10/2021 | ............. F42B 35/00 |

OTHER PUBLICATIONS

Machine translation of CN 109975356 (Year: 2019).*

(Continued)

*Primary Examiner* — Natalie Huls
(74) *Attorney, Agent, or Firm* — True Shepherd LLC; Andrew C. Cheng

(57) ABSTRACT

A method for evaluating a damage power of confined explosion, includes: determining a size of a confined case and a thickness of a target plate according to a requirement of evaluation on damage effectiveness of a warhead to establish an explosive damage effectiveness evaluation platform; calibrating parameters of the platform with a series of confined explosion tests of trinitrotoluene (TNT) bare charges in the case to form a relational map, in which a deflection of a mid-point of the target plate changes with a (Continued)

charge mass; obtaining a deflection of the mid-point of the target plate by detonating different warheads, forming different detonation atmosphere and forming different venting configuration in the case, and performing interpolation through the map to obtain an equivalent bare charge as an evaluation index. The method quantitatively evaluates the damage effectiveness of the warhead, and is not limited by the damage component.

3 Claims, 7 Drawing Sheets

(56) References Cited

U.S. PATENT DOCUMENTS

| | | | |
|---|---|---|---|
| 7,669,460 B1 * | 3/2010 | Sandusky | G01N 33/227 73/35.16 |
| 8,578,830 B2 | 11/2013 | Mccahon et al. | |
| 8,707,764 B1 * | 4/2014 | Di Stasio | G01L 5/14 73/35.14 |
| 10,030,957 B2 | 7/2018 | Flynn et al. | |

OTHER PUBLICATIONS

Kong Xiangshao et al., Experimental Study on the Mitigation Effects of Confined-blast Loading, Explosion and Shock Waves, Jun. 2021, vol. 41, pp. 062901-1-062901-14, China.

Lu Guangzhao et al., Deformation Response and Its Engineering Prediction of Steel Plate Subjected to Internal Blast Loading from CL-20-based Aluminized Explosive Charges, Acta Armamentarii, Aug. 2020, vol. 41, pp. 1510-1518, China.

* cited by examiner

DEVICE AND METHOD FOR EVALUATING DAMAGE POWER OF INTERNAL EXPLOSION

CROSS-REFERENCE TO RELATED APPLICATIONS

This application claims priority to Chinese Patent Application No. 202210219071.5 with a filing date of Mar. 8, 2022. The content of the aforementioned application, including any intervening amendments thereto, is incorporated herein by reference.

TECHNICAL FIELD

The present disclosure relates to the technical field of damage and protection, and in particular to a device and method for evaluating a damage power of confined explosion.

BACKGROUND

A warhead of a typical explosive includes an explosive fill and a bearing case. During detonation, the case is crushed under an internal high pressure, and a part of energy of the explosive fill is absorbed by the case. Hence, the explosive mass causing an actual damage to the structure is less than a charge mass. There is a large error to evaluate the damage of the explosive directly with the charge mass of the explosive. Therefore, the equivalent charge mass becomes an important parameter to evaluate the damage effectiveness of the warhead.

Conventional methods for calculating the equivalent charge mass mainly take a ratio of the charge mass to a mass of the case as a basis for conversion, without considering the effect of parameters such as the mass distribution and material performance of the case on a conversion result. Meanwhile, with the emergence and development of various novel explosives (including aluminized explosives) and novel warheads (warheads with reactive material), the conventional conversion methods are gradually far from satisfactory, and are to be improved and updated.

In addition, concerning protective measures, the inhibition effectiveness of the warhead is also not evaluated effectively, namely there are no specific indexes to evaluate the inhibition effectiveness of the warhead. For example, in a water mist atmosphere and an anoxic atmosphere, energy-releasing processes in detonation and combustion of the warhead are inhibited. Therefore, how to quantitatively evaluate the inhibition effectiveness is a vital problem to be solved urgently.

SUMMARY OF PRESENT INVENTION

A technical problem to be solved by the present disclosure is to provide a device for evaluating a damage power of confined explosions with a reasonable structure, a strong universality and a high accuracy, and an evaluation method thereof is further provided.

The present disclosure solves the technical problem with the following technical solutions: A device for evaluating a damage power of confined explosion includes an explosion device, the explosion device includes a confined explosion case; a cover plate is provided in a center of a top of the confined explosion case; four atmosphere conversion guiding holes are symmetrically formed in the top of the confined explosion case; two side plates and a rear plate of the confined explosion case are provided with an explosion venting device; a concentration tester guiding hole is formed in the side plates of the confined explosion case; two supporting members are symmetrically arranged at a bottom of the confined explosion case; a base is fixedly provided under the supporting members; and a front plate of the confined explosion case is sequentially and fixedly provided with a rear clamping plate, a target plate and a front clamping plate from the inside to the outside;

the cover plate is connected to a detonation control system through a lead;

the atmosphere conversion guiding holes each are connected to a pressure tank and a water pressure pump through a lead, and the pressure tank and the water pressure pump are configured to change a component composition in the confined explosion case; and the concentration tester guiding hole is externally connected to a concentration tester through a lead, and the concentration tester is configured to obtain a component and a concentration in the confined explosion case.

According to the above solutions, the confined explosion case is a cube.

According to the above solutions, the confined explosion case is connected to the cover plate through a bolt; the confined explosion case is connected to the explosion venting device through a bolt; the supporting members are connected to the base through a bolt; and the rear clamping plate, the target plate and the front clamping plate are connected through a bolt.

According to the above solutions, a hole for allowing a lead of the detonation control system to pass through is formed in a very center of the cover plate.

According to the above solutions, explosion venting holes of different diameters are formed in a center of the explosion venting device.

The present disclosure further provides a method for evaluating a damage power of confined explosion using the device described above, including the following steps:

S1: calibrating parameters to test structural responses caused by detonating different masses of trinitrotoluene (TNT) bare charges in a confined explosion case, thereby obtaining a final deflection of a mid-point of the target plate;

S2: forming a $\delta$-m relational map through repeated tests with the final deflection $\delta$ of the mid-point of the target plate and a charge mass m as variables; and S3: performing damage effectiveness evaluation tests for different requirements, including evaluation on damage effectiveness of a warhead, evaluation on inhibition effect of different atmosphere on the warhead and evaluation on effect of different venting configuration on the warhead.

According to the above solutions, following conditions are satisfied when the parameters are calibrated:

(1) a TNT explosive is suspended in the center of the confined explosion case through a lead; and a detonator used for detonating an explosive fill each time as well as performance of the TNT explosive is the same for all tests in calibration and evaluation;

(2) the guiding holes for the tests are completely confined in calibration; and an overall structure of the case does not show an obvious deflection, so as to form a stable test environment;

(3) the target plate in calibration is selected from a same batch of steel plates, with same thickness and basic mechanical performance; and in subsequent evaluation, a steel plate having same performance as the batch of steel plates is used;

(4) each set of calibration data ($\delta$, m) is an average from at least three repeated tests;

(5) a final calibration map is fitted with at least five sets of data, and a fit coefficient is not less than 0.95;

(6) no crevasse of the target plate is allowed in calibration; and if a damage component having a larger damage degree is to be evaluated, the calibration is performed again by changing a thickness of the target plate, a volume of the confined case and so on; and (7) map data is not used by extrapolation.

According to the above solutions, in step S3, warheads having different damage components are used to evaluate the damage effectiveness of the warheads; in the test, the warhead is suspended in a center of the confined case for detonation, and all guiding holes are confined; and upon completion of the test, a deflection of the mid-point of the target plate is measured, and a measured value $\delta_0$ is used for interpolation in the $\delta$-m map to search a corresponding charge mass $m_0$, namely an equivalent bare charge of the damage component.

According to the above solutions, in step S3, pressure tanks of different components are used respectively and the pressure of a pressure pump is adjusted accordingly; the different components are charged to the confined explosion case with a guiding tube from the atmosphere conversion guiding holes to form different gas atmosphere and water mist atmosphere having different particle sizes; the concentration tester is used to capture an internal concentration; when the concentration reaches a specified range, a TNT bare charge or a special damage component is detonated; and upon completion of explosion, a deflection measured value $\delta_1$ of the mid-point of the target plate is obtained, interpolation is performed in the $\delta$-m map to obtain a charge mass $m_1$, and a difference between the charge mass and a mass of the bare charge indicates the inhibition effect of the different atmosphere on the warhead.

According to the above solutions, in step S3, explosion venting devices of different diameters are used to form a detonation environment having different venting configuration; a TNT bare charge or a special damage component is detonated in the confined explosion case; and upon completion of explosion, a deflection measured value $\delta_2$ of the mid-point of the target plate is obtained, interpolation is performed in the $\delta$-m map to obtain a charge mass $m_2$, and a difference between the charge mass and a mass of the bare charge indicates the effect of the different venting configuration on detonation of the warhead.

The device for evaluating a damage power of confined explosion and the evaluation method thereof provided by the present disclosure achieve the following beneficial effects:

1. The present disclosure takes an equivalent bare charge as a measuring index, and calibrates a designed evaluation platform to obtain a $\delta$-m map. For a warhead having any damage component composition, the present disclosure can obtain an equivalent bare charge for quantitative comparison. The present disclosure makes up the shortages of a narrow application range and an obvious error of a calculated result in conventional methods for calculating the equivalent charge mass, and has a high universality, a wide application range, and a large engineering application value.

2. Through the established evaluation platform, the present disclosure can accurately and conveniently test the inhibition effect of different atmosphere on an explosive load in the confined space, and makes up the defect that the inhibition effect of different atmosphere is hardly quantized with the existing test method.

3. The present disclosure skillfully and accurately simulates a detonation environment having different venting configuration. With the introduction of the equivalent bare charge, the present disclosure can quantitatively evaluate the effect of the venting configuration on detonation of the warhead, thereby providing a new concept and method for engineering research.

4. The present disclosure takes the equivalent bare charge as a quantitative evaluation parameter for damage effectiveness of various novel weapons and inhibition effectiveness of protective structures. The evaluation system provides a technical support for anti-explosion design and damage evaluation of ships.

BRIEF DESCRIPTION OF THE DRAWINGS

The present disclosure is described in further detail with reference to the accompanying drawings and embodiments. In the drawings.

Figure 1:
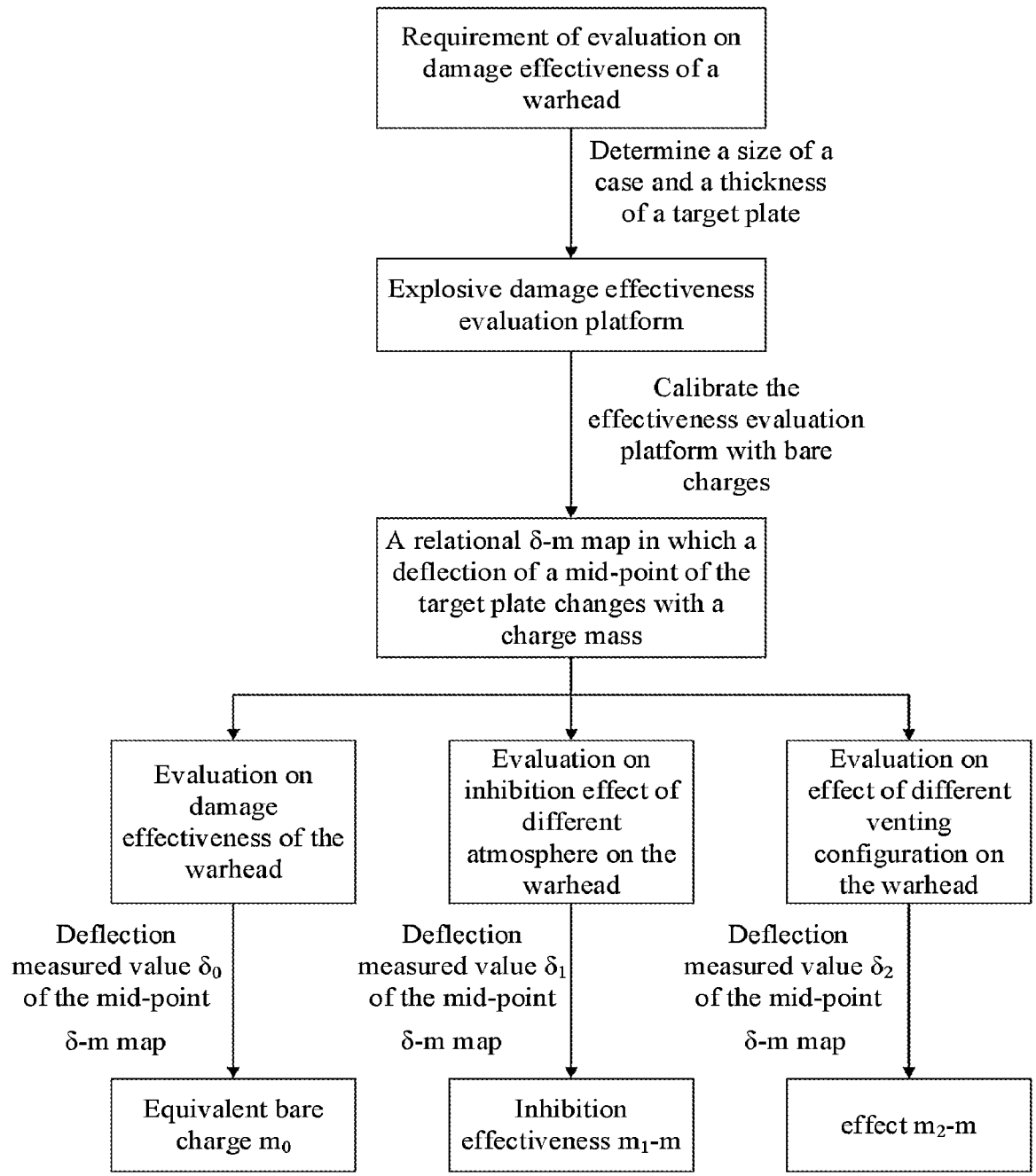
FIG. 1 is a schematic flowchart of a method for evaluating a damage power of confined explosion according to an embodiment of the present disclosure.
Figure 2:
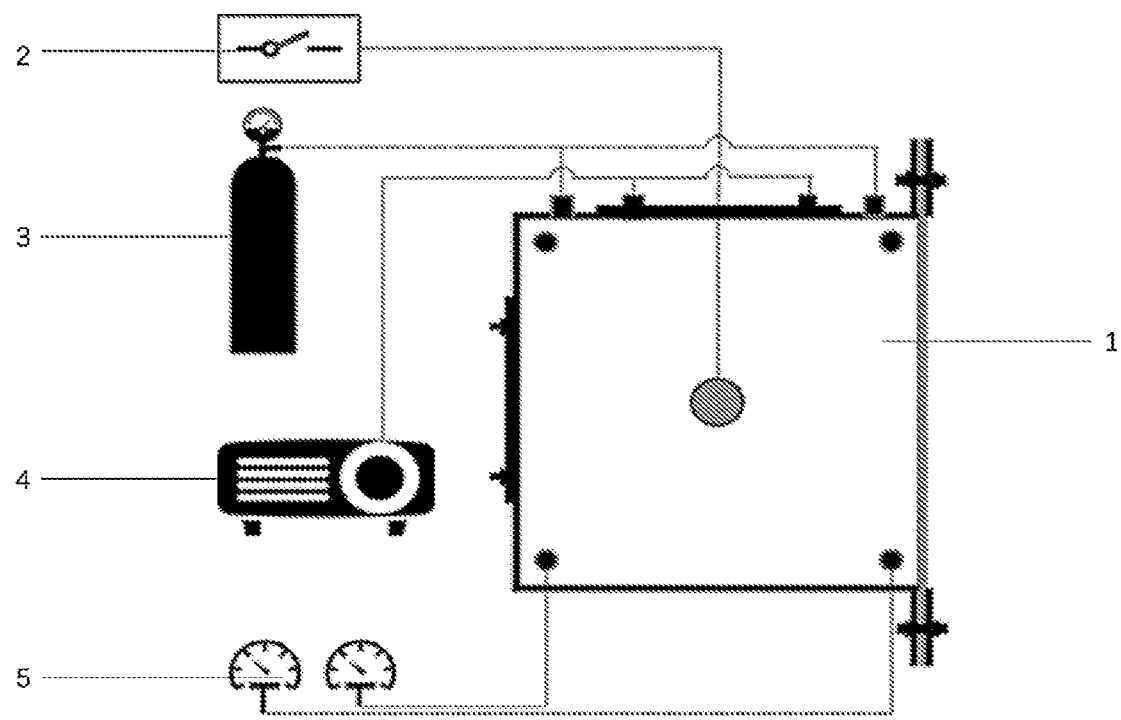
FIG. 2 is a schematic structural view of an overall platform according to an embodiment of the present disclosure.
Figure 3:
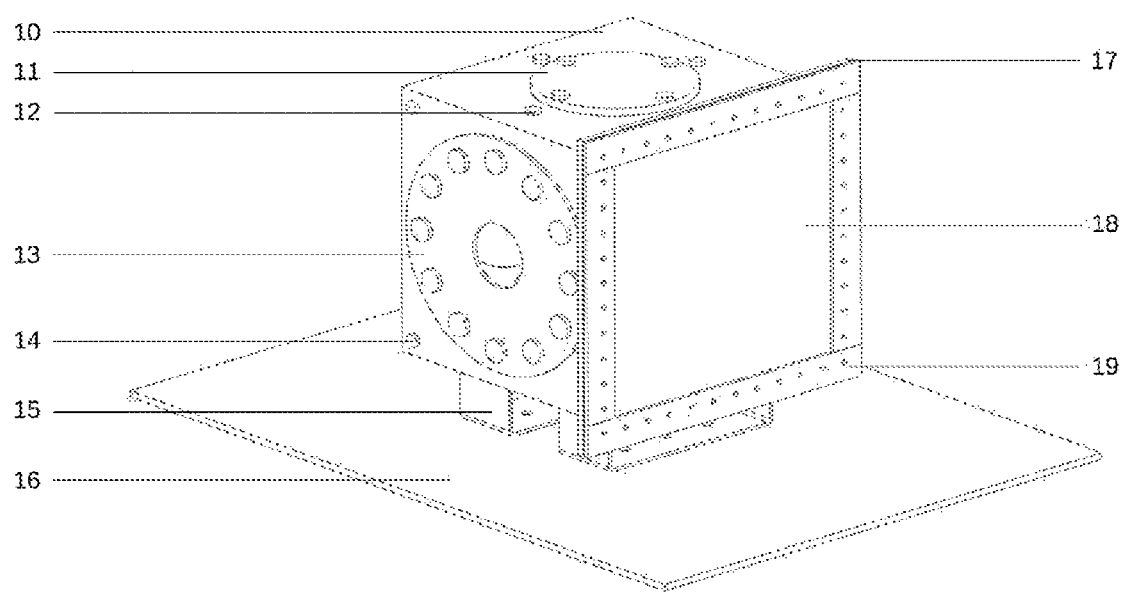
FIG. 3 is a schematic structural view of an overall explosion main body according to an embodiment of the present disclosure.
Figure 4:
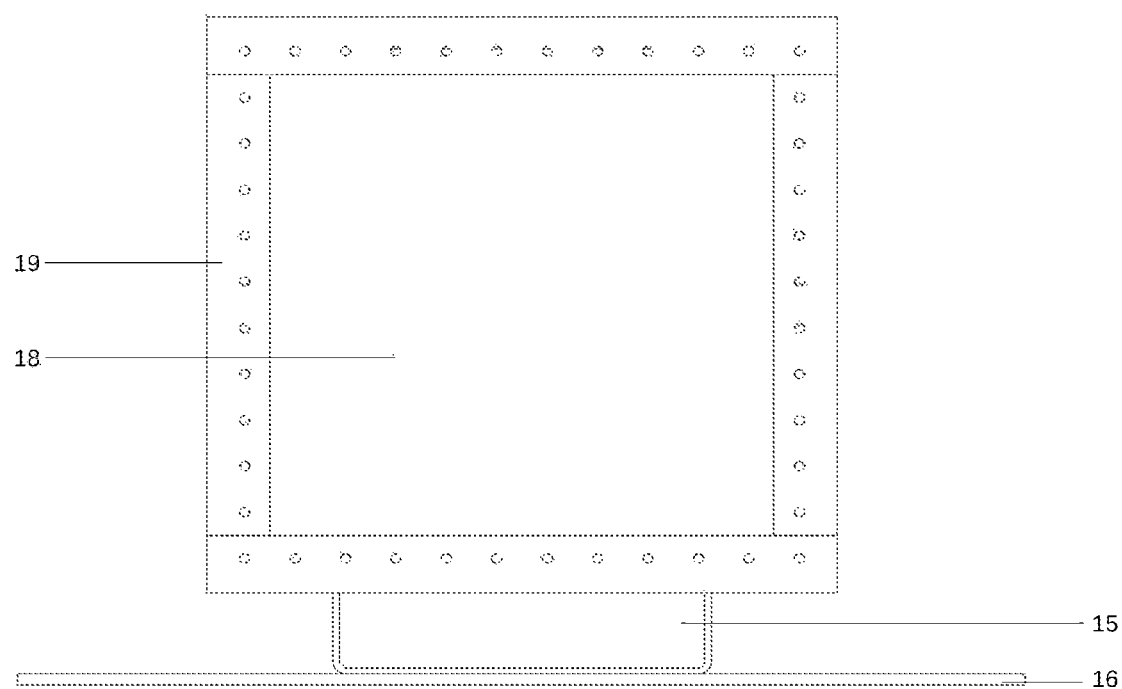
FIG. 4 is a schematic structural front view of an explosion main body according to an embodiment of the present disclosure.
Figure 5:
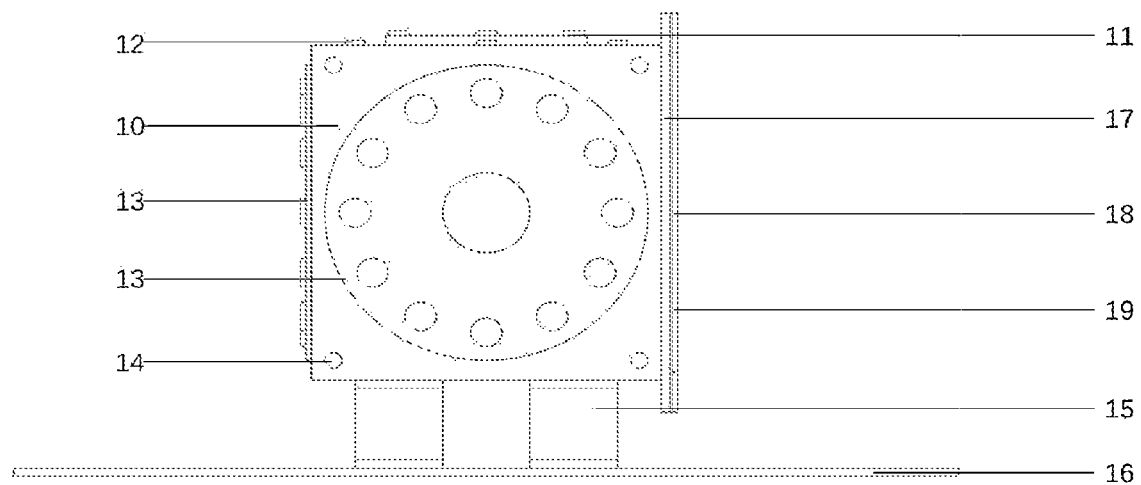
FIG. 5 is a schematic structural side view of an explosion main body according to an embodiment of the present disclosure.
Figure 6:
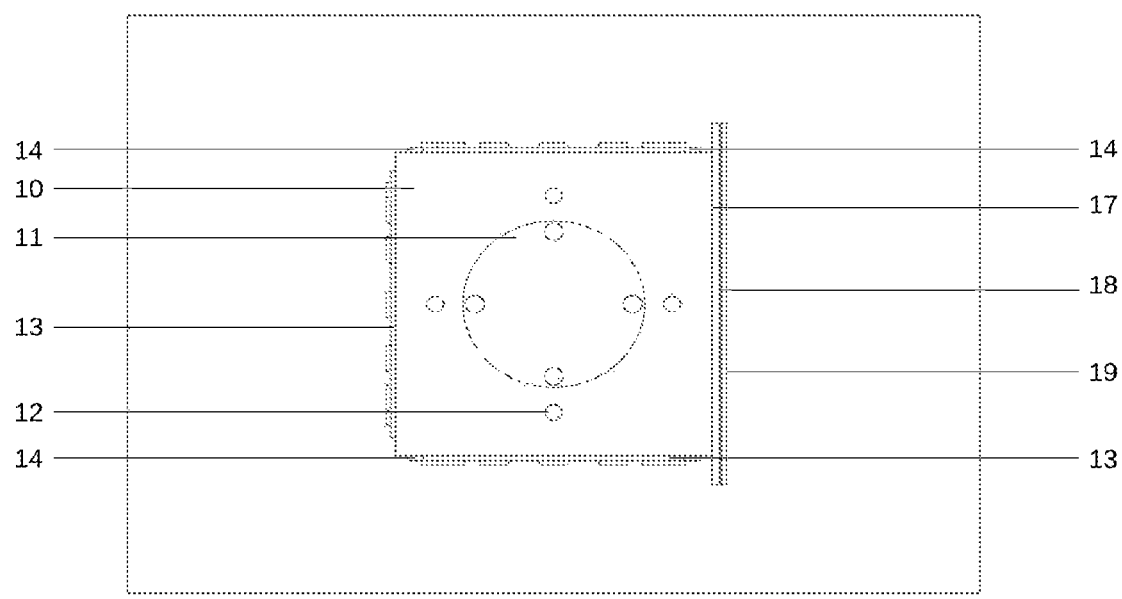
FIG. 6 is a schematic structural top view of an explosion main body according to an embodiment of the present disclosure.

Reference numerals: 1: explosion device, 2: detonation control system, 3: pressure tank, 4: water pressure pump, 5: concentration tester, 10: confined explosion case, 11: cover plate, 12: atmosphere conversion guiding hole, 13: explosion venting device, 14: concentration tester guiding hole, 15: support seat, 16: base, 17: rear clamping plate, 18: target plate, and 19: front clamping plate.

DETAILED DESCRIPTION OF THE EMBODIMENTS

In order to describe the technical features, objectives and effects of the present disclosure more clearly, the specific implementations of the present disclosure are described in detail below with reference to the accompanying drawings.

As shown in FIG. 1, the present disclosure provides a method for evaluating a damage power of confined explosion. The specific process is as follows:

Step 1: According to a requirement of evaluation on damage effectiveness of a warhead, an explosive damage effectiveness evaluation platform is established by taking an explosion device 1 as a main body and providing typical test devices such as a detonation control system 2, a pressure tank 3, a water pressure pump 4 and a concentration tester 5.

More specifically, the explosive damage effectiveness evaluation platform takes the explosion device 1 as the main body. The detonation control system 2, the pressure tank 3, the water pressure pump 4 and the concentration tester 5 are externally connected to various portions of the explosion device 1.

More specifically, the explosion device 1 includes an confined explosion case 10, a cover plate 11, atmosphere conversion guiding holes 12, an explosion venting device 13, a concentration tester guiding hole 14, supporting members 15, a base 16, a rear clamping plate 17, a target plate 18, and a front clamping plate 19. The confined explosion case 10 is a cube. The cover plate 11 is provided in a center of a top of the confined explosion case, and is connected to the confined explosion case through a detachable bolt. Four atmosphere conversion guiding holes 12 are further symmetrically formed in the top of the confined explosion case 10. Two side plates and a rear plate of the confined explosion case 10 are provided with the explosion venting device 13, and connected to the explosion venting device through a bolt. Two supporting members 15 are symmetrically arranged at a bottom of the confined explosion case 10, and fixedly connected. The support bases 15 are provided thereon with a bolt hole, and fixed on the base 16 through a bolt. The rear clamping plate 17 is welded on a front plate of the confined explosion case 10. A front panel of the rear clamping plate 17 is attached to a back panel of the target plate 18. The front clamping plate 19 is attached to a front panel of the target plate 18. The rear clamping plate 17, the target plate 18 and the front clamping plate 19 are provided with corresponding bolt holes at opposite positions, and connected by a bolt.

More specifically, a sufficiently small hole is formed in a very center of the cover plate 11. A lead of the detonation control system 2 is connected to an explosive through the hole.

More specifically, the atmosphere conversion guiding holes 12 each are externally connected to the pressure tank 3 and the water pressure pump 4. The pressure tank and the water pressure pump are configured to change a component composition in a confined space of the explosion device 1.

More specifically, explosion venting holes of different sizes are formed in a center of the explosion venting device 13. The explosion venting device 13 and the confined explosion case 10 can be detached and replaced by screwing on or off a bolt.

More specifically, the concentration tester guiding hole 14 is externally connected to a concentration tester 5. The concentration tester is configured to obtain a component and a concentration in the confined space of the explosion device 1.

Step 2: Parameters of an explosive damage effectiveness evaluation environment are calibrated through responses caused by confined explosion of TNT bare charges, and a relational map, in which a final deflection of a mid-point of the target plate 18 changes with a charge mass, is formed.

More specifically, after the explosive damage effectiveness evaluation platform is established, parameters of the explosive damage effectiveness evaluation platform are calibrated to test structural responses caused by detonating different masses of TNT bare charges in a confined explosion case, thereby obtaining a final deflection of a mid-point of the target plate 18.

More specifically, a $\delta$-m relational map is formed through repeated calibration with the final deflection $\delta$ of the mid-point of the target plate and the charge mass m as variables.

More specifically, matters needing attentions and compliance in calibration are as follows:

(1) A TNT explosive is suspended in the center of the confined case through a lead. A detonator used for detonating an explosive fill each time as well as performance of the TNT explosive is the same for all tests in calibration and evaluation.

(2) The guiding holes for the tests are completely confined in calibration. An overall structure of the case does not show an obvious deflection, so as to form a stable test environment.

(3) The target plate in calibration is selected from a same batch of steel plates, with same thickness and basic mechanical performance; and in subsequent test evaluation, a steel plate having same performance as the batch of steel plates is used.

(4) Each set of calibration data ($\delta$, m) is an average from at least three repeated tests.

(5) A final calibration map is fitted with at least five sets of data, and a fit coefficient is not less than 0.95.

(6) No crevasse of the target plate is allowed in calibration. If a damage component having a larger damage degree is to be evaluated, the calibration is performed again by changing a thickness of the target plate, a volume of the confined case and so on.

(7) Map data is not used by extrapolation.

Step 3: Damage effectiveness evaluation tests are performed for different requirements with the relational map formed by the calibration, thereby obtaining an equivalent bare charge $m_0$ as an evaluation index.

More specifically, upon completion of the system calibration, the damage effectiveness evaluation tests can be performed for the different requirements, mainly including evaluation on damage effectiveness of a warhead, evaluation on the inhibition effect of different atmosphere on the warhead and evaluation on the effect of different venting configuration on the warhead.

Embodiment 1: warheads (such as a conventional warhead, an aluminum-containing warhead, and a warhead with reactive material) having different damage components were used to evaluate damage effectiveness of the warheads. The test was completed in a confined case having inner dimensions of 1800 mm*800 mm*800 mm. The target plate had a cross-sectional size of 1100 mm*1100 mm, and a thickness of 4.7 m. The target plate was made of Q235 steel, with the damaged area under the warhead being 800 mm*800 mm. In the test, the warhead was suspended in a center of the confined case, and all guiding holes were confined. Upon completion of the test, a deflection of a mid-point of the target plate was measured. The parameters of the explosive damage effectiveness evaluation platform were calibrated with TNT bare charges, namely different equivalent weights of TNT explosives were used for detonation to obtain a final deflection $\delta$ of the mid-point of the target plate. Measured data was shown in Table 1.

TABLE 1

| Measured data | | | | | |
|---|---|---|---|---|---|
| TNT charge mass in unit volume m/v(kg/m$^3$) | 0.04 | 0.08 | 0.12 | 0.16 | 0.2 |
| Deflection of the mid-point of the target plate $\delta_0$(mm) | 17.44 | 29.57 | 40.83 | 51.21 | 60.72 |

Figure 7:
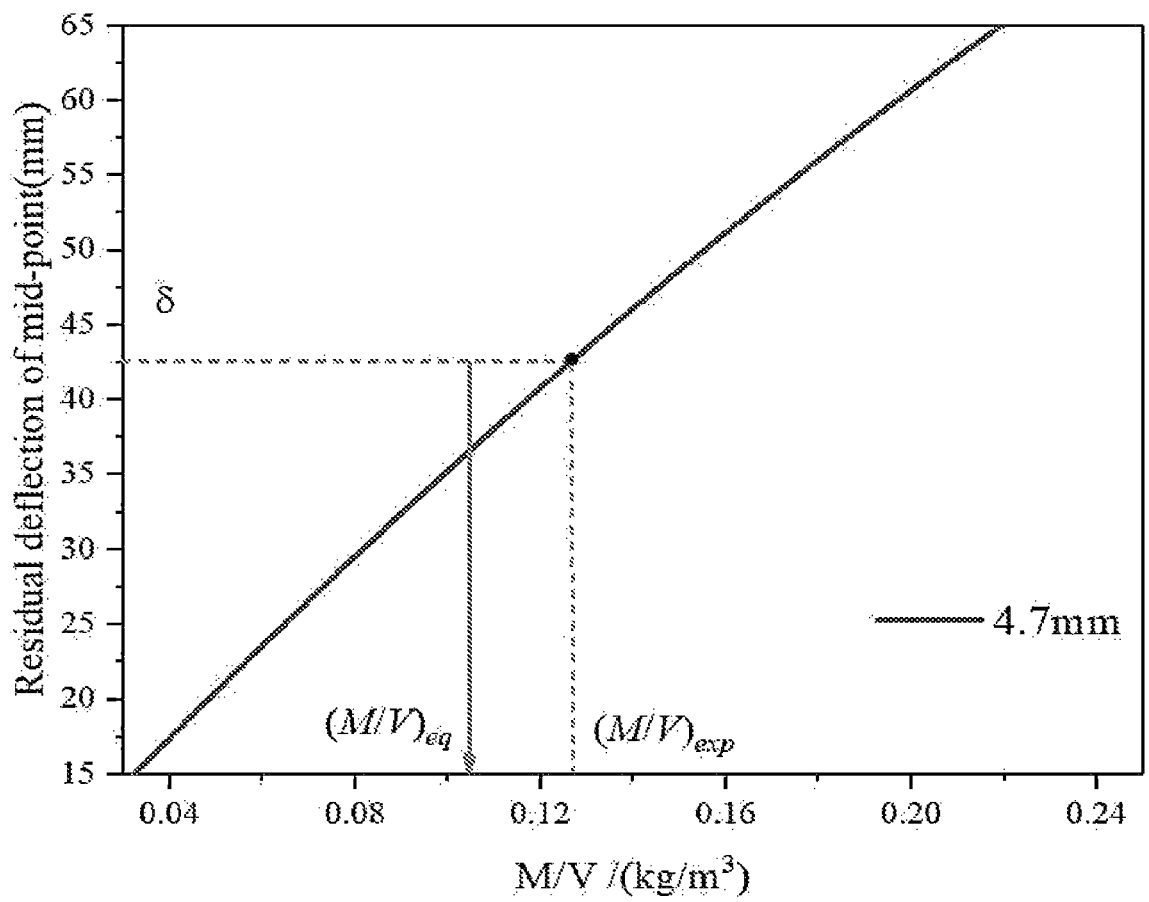
FIG. 7 is a $\delta$-m relational map according to Embodiment 1.

The $\delta$-M/V relational map drawn according to the table was as shown in FIG. 7. Therefore, the parameters of the explosive damage effectiveness evaluation platform were calibrated completely. An explosive to be tested was used for detonation. The final deflection of the mid-point of the target plate was 42.6 mm. The corresponding TNT charge mass in unit volume was 0.128 kg/m³ according to the δ-M/V relational map. According to an internal volume of the confined explosion case, the corresponding TNT charge mass was 90 g, which was the equivalent bare charge of the damage component.

Embodiment 2: By using a pressure tank 3 of different components and adjusting the pressure of the pressure pump 4, and charging the different components to the confined explosion case 10 respectively from the atmosphere conversion guiding holes 12 with a guiding tube, different gas atmosphere and water mist atmosphere having different particle sizes could be formed. The concentration tester 5 was used to capture an internal concentration. When the concentration reached to a specified range, a TNT bare charge or a special damage component was detonated. Upon completion of explosion, a deflection measured value $\delta_0$ of the mid-point of the target plate was obtained. Interpolation was performed in the δ-m map to obtain a charge mass $m_0$, and a difference ($m_0$–m) between the charge mass and a mass of the bare charge (or the equivalent bare charge) could indicate the inhibition effect of the different atmosphere on the warhead.

Embodiment 3: By using the explosion venting device 13 of different diameters, a detonation environment having different venting configuration could be formed. A TNT bare charge or the special damage component was detonated in the confined explosion case 10. Upon completion of explosion, a deflection measured value $\delta_0$ of the mid-point of the target plate was obtained. Interpolation was performed in the δ-m map to obtain a charge mass $m_0$. A difference ($m_0$–m) between the charge mass and a mass of the bare charge (or the equivalent bare charge) could indicate the effect of the different venting configuration on detonation of the warhead.

The foregoing descriptions are merely specific implementations of the application, but the protection scope of the application is not limited thereto. Any modification, variation or replacement, and improvement readily figured out by a person skilled in the art within the technical scope disclosed in the application shall fall within the protection scope of the application.

The embodiments of the present disclosure have been described above with reference to the accompanying drawings, but the present disclosure is not limited to the foregoing specific implementations. The foregoing specific implementations are only illustrative and not restrictive. Under the inspiration of the present disclosure, a person of ordinary skill in the art can make many improvements without departing from the purpose of the present disclosure and the protection scope defined by the claims, and these improvements shall fall within the protection scope of the present disclosure.

What is claimed is:

1. A method for evaluating a damage power of confined explosion, wherein an evaluation device comprising an explosion device is used; the explosion device comprises a confined explosion case; a cover plate is provided in a center of a top of the confined explosion case; four atmosphere conversion guiding holes are symmetrically formed in the top of the confined explosion case; two side plates and a rear plate of the confined explosion case are provided with an explosion venting device; a concentration tester guiding hole is formed in the side plates of the confined explosion case; two supporting members are symmetrically arranged at a bottom of the confined explosion case; a base is fixedly provided under the supporting members; and a front plate of the confined explosion case is sequentially and fixedly provided with a rear clamping plate, a target plate and a front clamping plate from inside to outside;

the cover plate is connected to a detonation control system through a lead;

the atmosphere conversion guiding holes each are connected to a pressure tank and a water pressure pump through a guiding tube, and the pressure tank and the water pressure pump are configured to change a component composition in the confined explosion case;

the concentration tester guiding hole is connected to a concentration tester through a lead, and the concentration tester is configured to obtain a component and a concentration in the confined explosion case; the confined explosion case is connected with the cover plate through a bolt; the confined explosion case is connected to the explosion venting device through a bolt; the supporting members are connected to the base through a bolt; the rear clamping plate, the target plate and the front clamping plate are connected through a bolt; a hole for allowing a lead of the detonation control system to pass through is formed in a very center of the cover plate; and explosion venting holes of different diameters are formed in a center of the explosion venting device; and the method comprises the following steps:

S1: calibrating parameters to test structural responses caused by detonating different masses of trinitrotoluene (TNT) bare charges in the confined explosion case, thereby obtaining a final deflection of a mid-point of the target plate;

S2: forming a δ-m relational map through repeated tests with the final deflection δ of the mid-point of the target plate and a charge mass m as variables; and S3: performing damage effectiveness evaluation tests for different requirements, comprising evaluation on damage effectiveness of a warhead, evaluation on inhibition effect of different atmosphere on the warhead and evaluation on effect of different venting configuration on the warhead, wherein in step S3, a warhead having different damage components is used to evaluate the damage effectiveness of the warhead; in the test, the warhead is suspended in a center of the confined case for detonation, and all guiding holes are confined; and upon completion of the test, a deflection of the mid-point of the target plate is measured, a measured value $\delta_0$ is used for interpolation in the δ-m map to search a corresponding charge mass $m_0$, and the corresponding charge mass $m_0$ is an equivalent bare charge of the damage component;

in step S3, a pressure tank of different components is used and a pressure of a pressure pump is adjusted accordingly; the different components are respectively charged to the confined explosion case with a guiding tube from the atmosphere conversion guiding holes to form different gas atmosphere and water mist atmosphere having different particle sizes; the concentration tester is used to capture an internal concentration; when the concentration reaches a specified range, a TNT bare charge is detonated; and upon completion of explosion, a deflection measured value $\delta_1$ of the mid-point of the target plate is obtained, interpolation is performed in the δ-m map to obtain a charge mass $m_1$, and a difference between the charge mass and a mass of the bare charge indicates the inhibition effect of the different atmosphere on the warhead; and in step S3, explosion venting devices of different diameters are used to form a detonation environment having different venting configuration; a TNT bare charge is detonated in the confined explosion case; and upon completion of explosion, a deflection measured value $\delta_2$ of the mid-point of the target plate is obtained, interpolation is performed in the $\delta$-m map to obtain a charge mass $m_2$, and a difference between the charge mass and a mass of the bare charge indicates the effect of the different venting configuration on detonation of the warhead.

2. The method according to claim 1, wherein following conditions are satisfied when the parameters are calibrated:

(1) a TNT explosive is suspended in the center of the confined explosion case through a lead; and a detonator used for detonating an explosive fill each time as well as performance of the TNT explosive is the same for all tests in calibration and evaluation;

(2) the guiding holes for the tests are completely confined in calibration; and an overall structure of the case does not show an obvious deflection, so as to form a stable test environment;

(3) the target plate in calibration is selected from a same batch of steel plates, with same thickness and basic mechanical performance; and in subsequent evaluation, a steel plate having same performance as the batch of steel plates is used;

(4) each set of calibration data ($\delta$, m) is an average from at least three repeated tests;

(5) a final calibration map is fitted with at least five sets of data, and a fit coefficient is not less than 0.95;

(6) no crevasse of the target plate is allowed in calibration; and if a damage component having a larger damage degree is to be evaluated, the calibration is performed again by changing a thickness of the target plate, and a volume of the confined case; and (7) map data is not used by extrapolation.

3. The method according to claim 1, wherein the confined explosion case is a cube.

* * * * *